(12) United States Patent
Wilkins

(10) Patent No.: US 7,312,803 B2
(45) Date of Patent: Dec. 25, 2007

(54) METHOD FOR PRODUCING GRAPHICS FOR OVERLAY ON A VIDEO SOURCE

(75) Inventor: David Wilkins, Montreal (CA)

(73) Assignee: X20 Media Inc., Montreal, Quebec (CA)

( * ) Notice: Subject to any disclaimer, the term of this patent is extended or adjusted under 35 U.S.C. 154(b) by 153 days.

(21) Appl. No.: 10/856,872

(22) Filed: Jun. 1, 2004

(65) Prior Publication Data

US 2005/0264583 A1    Dec. 1, 2005

(51) Int. Cl.
G06F 3/00    (2006.01)
G09G 5/02    (2006.01)
G06F 3/048    (2006.01)

(52) U.S. Cl. ............... 345/629; 345/619; 345/630; 345/650; 715/700; 715/719; 715/788; 715/798

(58) Field of Classification Search ........ 345/629–630, 345/631, 632, 636, 619, 624, 638, 650; 715/700, 715/716, 719, 732, 764, 788, 798, 800, 815, 715/726

See application file for complete search history.

(56) References Cited

U.S. PATENT DOCUMENTS

| 6,154,207 A * | 11/2000 | Farris et al. ............. 715/500.1 |
| 6,201,538 B1 * | 3/2001 | Wugofski .................... 715/716 |
| 2003/0196169 A1 * | 10/2003 | Wittkotter et al. .......... 715/513 |
| 2004/0025178 A1 * | 2/2004 | Gordon et al. ................ 725/37 |
| 2004/0117819 A1 * | 6/2004 | Yu .............................. 725/32 |
| 2004/0167806 A1 * | 8/2004 | Eichhorn et al. .............. 705/3 |
| 2004/0257369 A1 * | 12/2004 | Fang .......................... 345/501 |
| 2007/0005795 A1 * | 1/2007 | Gonzalez .................... 709/232 |

* cited by examiner

Primary Examiner—Wesner Sajous
(74) Attorney, Agent, or Firm—Blake, Cassels & Graydon LLP; Daphne L. Maravei

(57) ABSTRACT

Discloses a method for producing graphical overlay elements on a source video program stream using Microsoft PowerPoint slides as a source of the graphical overlay elements to be overlaid on the source video program stream, including representations of real-time information such as stock quotes or weather data. A computer software algorithm is describe which includes a PowerPoint data objects parser that interacts with PowerPoint data objects and user input to create and control the overlay of PowerPoint graphical elements on the source video program stream. The PowerPoint data objects parser produces enhanced data objects representing the overlay graphic elements that include mask and alpha channel data for use a graphics engine to composite the enhanced data objects of the overlay graphic elements with an input video program stream.

19 Claims, 5 Drawing Sheets

METHOD FOR PRODUCING GRAPHICS FOR OVERLAY ON A VIDEO SOURCE

FIELD OF THE INVENTION

This invention relates to computer graphics and more particularly to production of computer graphics suitable for compositing to a video feed signal to produce an output video signal that combines the computer graphics with the video feed signal

BACKGROUND TO THE INVENTION

Video programming, such as broadcast video signals, frequently includes additional visual information in the video signal to provide further information or a context to the video signal. For example, a television station or network that is broadcasting a movie may include a graphic representation of the television station or network in some portion of the broadcast video signal to identify the station or network that is airing the movie.

Generally, specialized hardware equipment and broadcast specific technologies have been used to provide the facility to incorporate such additional graphics into the programming source video to produce an output video signal which includes both the programming source video and the graphic element which was introduced. Typically, systems such as these require purchase of specialized equipment and training of individuals to use the specialized equipment to provide the capability to produce a composite video stream. Outside of the video industry field, many computer based graphics programs are in common use by a great number of individuals such as, for example, CorelDraw (trademark) produced by Corel Corporation or PowerPoint (trademark) produced by Microsoft Corporation. These graphics programs have a large user base and many people have a working knowledge of how to produce graphics using these general purpose graphics applications. However, such graphics applications are not suitable for use in the broadcast environment to produce composite graphics overlays that can be integrated into a composite video signal.

With computer based graphics programs that are in wide spread use, an increased number of personnel that work in the broadcast industry, video enthusiasts or others can originate graphics, ideas and assets that can be readily incorporated into a broadcast program or a video output. The graphics can be incorporated without the need or requirement to purchase specialized equipment or provide specialized training on use of existing broadcast or video equipment. Consequently, there is a need to increase the availability of graphics authors that would promote the innovation and use of graphics in production of television signals.

SUMMARY OF THE INVENTION

The present invention overcomes the shortcomings of the prior art by providing a capability to graphics programs to produce graphics that can be readily incorporated into a broadcast signal or overlaid onto a video signal by using existing graphics authoring capabilities. In one of its aspects, the invention provides a method for combining a source video signal and one or more graphical elements using an existi rg computer-based graphics program to generate a composite video signal. The method comprises providing a work area in the computer-based graphics program to enable a user to add data objects thereto, the data objects being available from the computer-based graphics program and being associated with the one or more graphical elements; providing in the work area, a region for the source video signal; enabling the user to interact with the work area to control the location, size, and appearance of the one or more graphical elements in relation to the region for the source video signal; generating a graphical overlay using the graphical elements according to the current state of the work area; combining the graphical overlay and the source video signal to generate the composite video signal; and providing the composite video signal as an output to be used by a graphics engine; wherein the preexisting computer-based graphics program is a commercially available software program that is independently operable to provide stand-alone functionality for at least one use other than the method.

In another aspect, a method for adapting an existing computer-based graphics program for generating a composite video feed is provided comprising providing a software tool in the computer-based graphics program that enables a user to load an overlay interface for adding data objects available directly from the computer-based graphics program; providing in the overlay interface, a region for a source video signal; and enabling the user to generate a composite video signal using the software tool, the composite video signal comprising the source video signal and one or more graphical elements associated with the data objects; wherein the preexisting computer-based graphics program is a commercially available software program that is independently operable to provide stand-alone functionality for at least one use other than the method.

A preferred embodiment of the invention will now be described with reference to the accompanying description and drawings in which:

DETAILED DESCRIPTION OF THE PREFERRED EMBODIMENT

Figure 1:
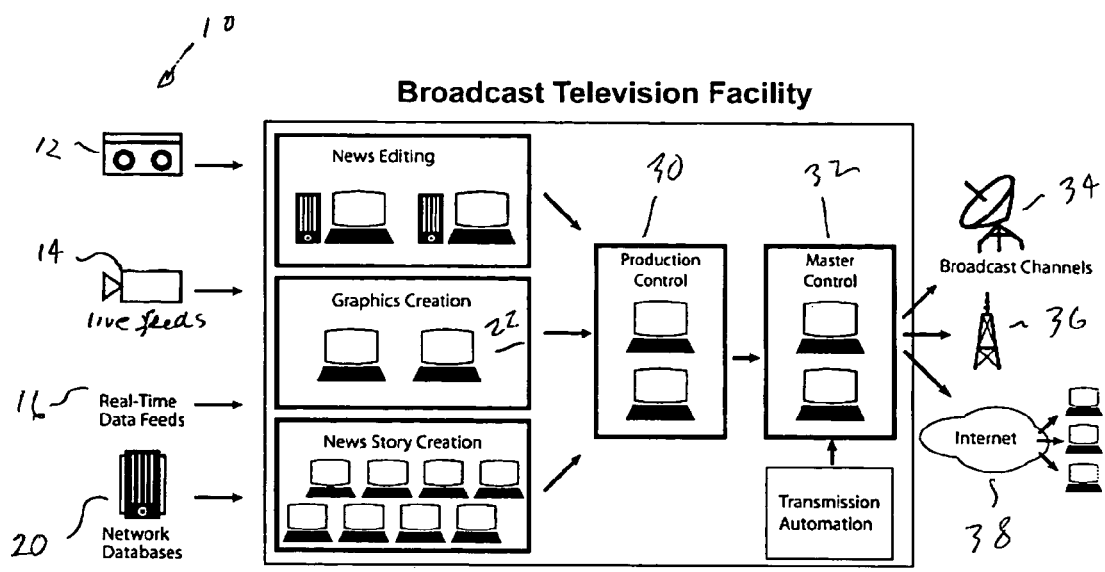
FIG. 1 is a functional block diagram of the operational elements of a conventional broadcast television facility.

FIG. 1 is a functional block diagram of the production elements of a conventional broadcast television facility. The television facility has a number of computer processing workstations each having a function that will be explained briefly. A plurality of video sources 10 provide the programming material that is supplied to the broad cast television facility. The video sources can include recorded video 12 such as movies, advertisements, stock footage, etc. as one form of the video sources. Another form of video source material would be camera captured live feeds 14, such as for sporting events, talk shows and other content that is received and intended to be broadcast in real time or near real time. Other sources of video material include real time data feeds, which can contain information such as temperature and weather data, stock market ticker symbol, trading values and database information of a constantly changing nature. Similarly, network databases 20 can be used as a source of programming material. Thus the programming sources include video materials such as the recorded video source 12 or live feed source 14 as well as information that requires adaptation to be presented in a broadcast video format such as the real time data feed 16. Network databases 20 are provided which can be used to control scheduling or contain historical data or other information that is desired to be included in a broadcast. These programming sources are then edited as required to produce a video broadcast material.

Various forms of editing can take place such as writing scripts for broadcasters to read relating to the news. The real time data feeds can include a graphics creation process for graphic artists to assemble various graphics to represent overlays for example, for a weather broadcast or ticker symbols to crawl across a broadcast screen. The various editing and composing steps are shown in the correspondingly labeled portions within the box labeled as the "Broadcast Television Facility". The material to be broadcast is selected by personnel operating the production control equipment 30 and master control equipment 32, which encodes and processes the video produced for dissemination over satellite, terrestrial or internet based communication facilities 34, 36 and 38 respectively.

The step of graphics creation 22 serves a number of functions and can relate to a variety of sources of information. For example, the graphics creation step includes assembly of still pictures and appropriate overlay text for presentment as a still picture for broadcast. Also, the graphics creation step includes conversion of real time data feeds, representing for example ticker symbols, into a scrolling text presentation presented across a lower portion of the broadcast video signal. It is the graphics creation step 22 that is the particular broadcast function that this invention relates to.

In the past, the step of graphics creation required specific hardware platforms and graphics packages to incorporate the real time data feeds or to produce other graphics, for example, weather sequences relying on satellite imaging etc. all of which require specialized training, hardware and software acquisition.

The present invention provides a software component that inter-operates with a PowerPoint (trademark) application and the PowerPoint (trademark) data objects to produce an output that is adapted for use as overlay graphics as part of the graphics creation step 22. By relying on the widely available interface of PowerPoint (trademark) to produce the graphics, a larger user base including anyone who has experience in producing PowerPoint (trademark) presentations can use the familiar PowerPoint (trademark) construction and graphics creation tools to create graphics suitable for use as video or broadcast video graphics.

Figure 2:
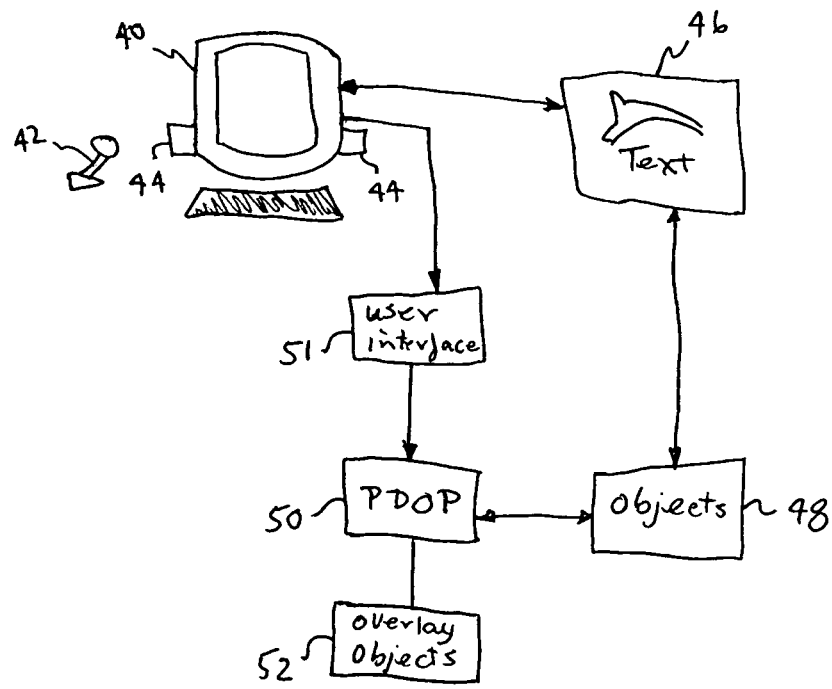
FIG. 2 shows a functional block diagram of a preferred embodiment of the invention illustrating the inter-operation of the invention with a PowerPoint (trademark) application.

FIG. 2 shows a functional block diagram of a preferred embodiment of the invention illustrating the inter-operation of the invention with a PowerPoint (trademark) application. A user operates a personal computer 40 which has the customary display, display, graphics card and monitor for output and a keyboard and mouse for input. In addition, the computer preferably has a microphone 42 to provide an audio capture capability and speakers 44 to provide audio output. The user interacts with the personal computer 40 to produce a PowerPoint (trademark) slide 46 which contains graphical elements selected from the roster of graphic elements available to PowerPoint (trademark) users. The graphic elements can include text, which, in essence, are specialized graphic elements that present readable characters. The user composition of PowerPoint (trademark) slides provides a graphical representation on the slide 46, which is customarily shown on the display of the computer 40. In arranging the graphic elements of the slide 46, the PowerPoint (trademark) application relies on a data representation of the various objects 48 that are used to produce the visual display of the PowerPoint (trademark) slide 46. The present invention provides a PowerPoint (trademark) data objects parser (PDOP) 50 which takes its input the PowerPoint (trademark) objects 48 together with user input from personal computer 40. User input to the PDOP 50 is provided by means of a user interface provided to enable the user to interact with the PDOP 50 to produce overlay objects 52. Overlay objects 52 are in suitable form including a mask or alpha channel to provide a compositing capability to enable the overlay objects to be incorporated into a video program stream to produce an output video overlay stream.

Figure 3:
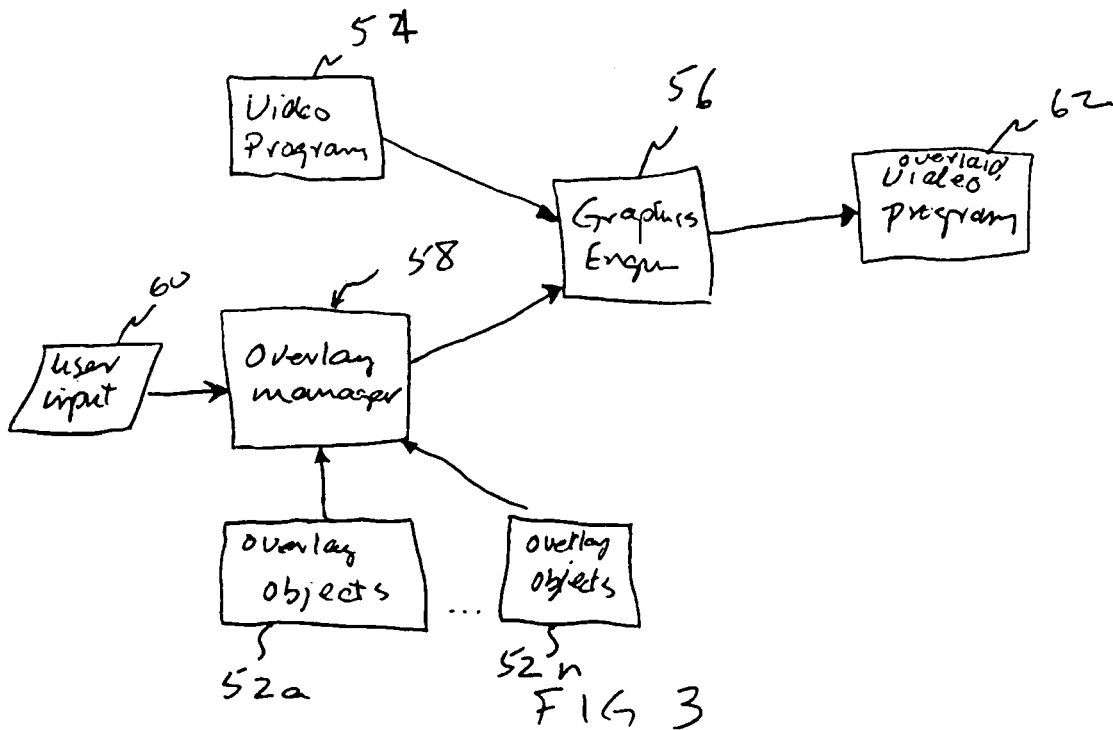
FIG. 3 shows a functional block diagram of the graphics processing portions of the invention.

FIG. 3 shows a functional block diagram of the graphics processing portions of a preferred embodiment of the invention. An input video program stream 52 is provided, which is typically sourced from one of the programming sources 10 depicted in FIG. 1. The input video program stream 52 is supplied to a graphics engine 56 of a personal computer. The graphics engine is, for example, the DirectDraw (trademark) graphic processing extensions available in the DirectX (trademark) application suite produced by Microsoft Corporation and supplied as part of the Microsoft Windows (trademark) operating system.

An overlay manager 58 operates under user control 60 to select one or more overlay objects 52a through 52n to provide graphics instructions to graphics engine 56. Graphics engine 56 operates to combine the inputs obtained from the overlay manager based on the selected overlay object or objects and the video programming stream 54 to produce an overlay video programming stream as output 62. In this manner, the PowerPoint (trademark) objects that a user has created are adapted to function as overlay objects that are overlaid on a video programming stream to produce an overlaid output video programming stream which incorporates the graphics elements produced by the user. Thus, the graphics capability of PowerPoint (trademark) is made available to annotate and enhance video sources. Examples of typical applications where this functionality could be used include live presentations, corporate information channels, cable television channels and community channels, closed circuit video network, hotel hospitality channels and electronic signage for public areas such as malls and airports.

Figure 4:
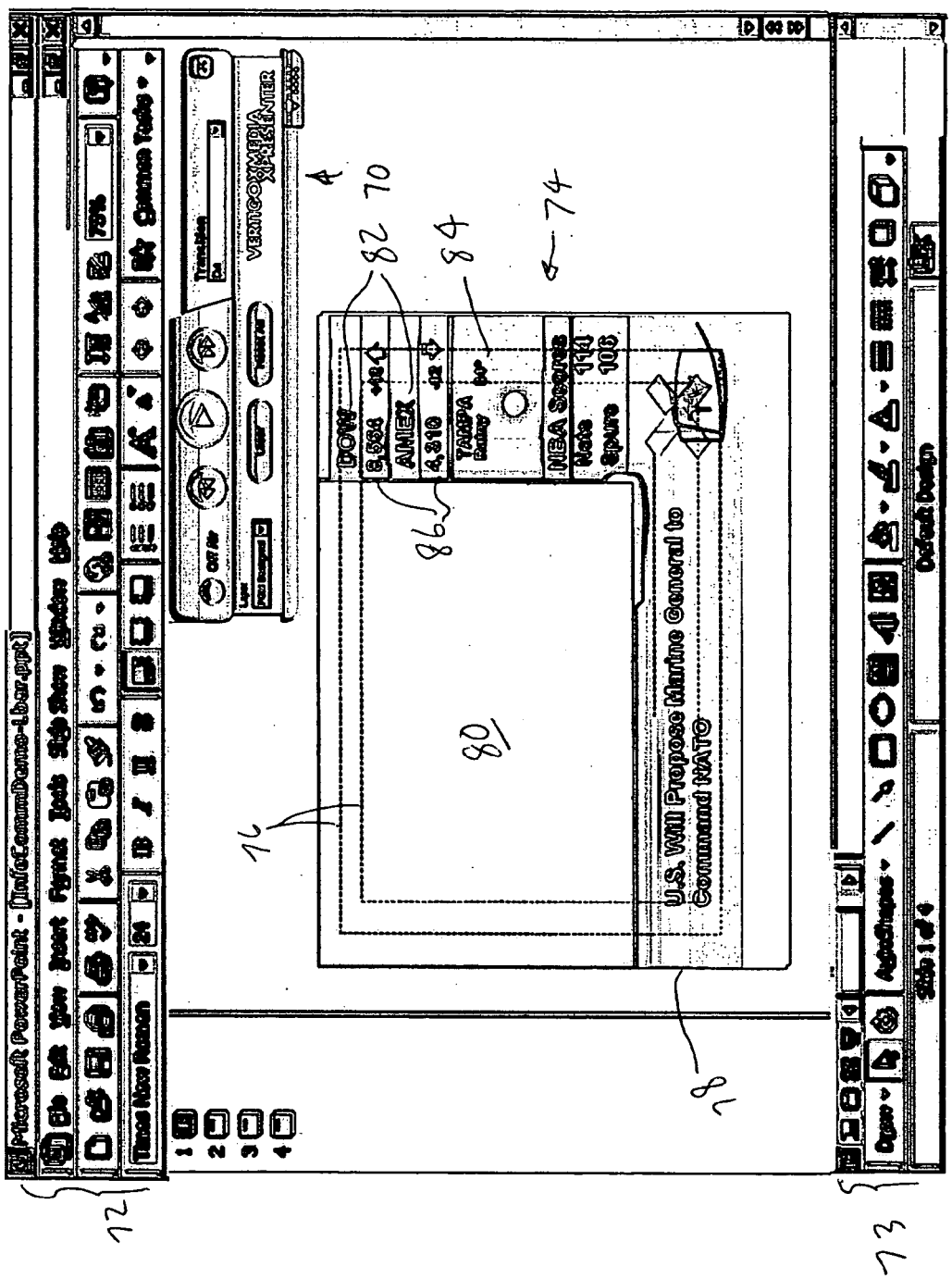
FIG. 4 shows an example display of an interface of a preferred embodiment of the present invention presented to a user.

FIG. 4 shows an example display of a preferred embodiment of a user interface of the present invention as presented to a user on a computer display. The user interface is generally shown at 70 and preferably presented as a floating dialog box. In the example placement shown in FIG. 4, the user interface dialog box 70 is located in the document or slide work area of a PowerPoint (trademark) application workspace. The PowerPoint (trademark) interface 72, 73 presents a number of graphical images or icons to a user, which the user interacts with to perform add, change, remove operations on the graphical elements contained in a slide 46. For example, user operations effected through the PowerPoint (trademark) interface 72, 73 include fetching a presentation or a slide of a presentation as well as construction of new slide presentations or slides in a presentation. In addition the PowerPoint (trademark) interface 72, 72 facilitates interaction with any of the graphical elements that are added to or contained within a slide of the slide presentation to control the location and appearance of each graphical element on the corresponding slide 46.

In the example of FIG. 4, the user has a slide 46 in a work area generally shown by reference numeral 74. Preferably, the user interface 51 enhances the visual display of the slide work area 74 to provide bounding lines 76 that provide a user with an indication of the NTSC television boundary areas, generally referred to as the title safe area and action safe area. To indicate the title safe area and action safe area to a user, bounding lines 76 are provided. These bounding lines 76 are provided for information only and do not limit the ability of the user to locate graphic content of the graphical elements which a user places in the screen or slide 74. The slide includes a number of graphical elements including a graphical sidebar 78, which extends along the lower portion and right portions of the broadcast screen area. A source video area 80 is an overlay object used by the PDOP 50 which is provided to size and locate an input video area used for presentation of a source program material in the output composite video that will be produced from this slide. Other graphic elements shown in this figure include text elements 82. In addition graphical representation of data derived from a real time data feed, such as temperature 84 or stock market quotation information 86, is shown on the exemplary slide. Each of these graphical elements and text elements are introduced onto the slide using the tools and interface 72, 73 familiar to PowerPoint (trademark) users.

When an element is added to the slide or when an element that is in the slide is selected, the corresponding properties of that element for the purposes of the Video overlay are presented to the user in the overlay interface 70. The overlay interface 70 provides the user with the capability to control the presentation of that element in the output video stream that would be produced from the slide. The user control of includes the ability to provide a mask or alpha channel for the element that will control the opacity of the graphical image of the element and therefore the ability of that graphical element to cover or overlay the underlying video feed. The PDOP 50 produces and maintains the mask or alpha channel of the selected PowerPoint (trademark) object based on the user interaction with the user interface 51 as depicted in the process flow of FIG. 2 or as shown in an example user interface format in FIG. 4.

In this manner, a graphic can be constructed for composition with a video feed or live data feeds to produce an output composite image that contains visual presentation of each of these sources of information.

Figure 5:
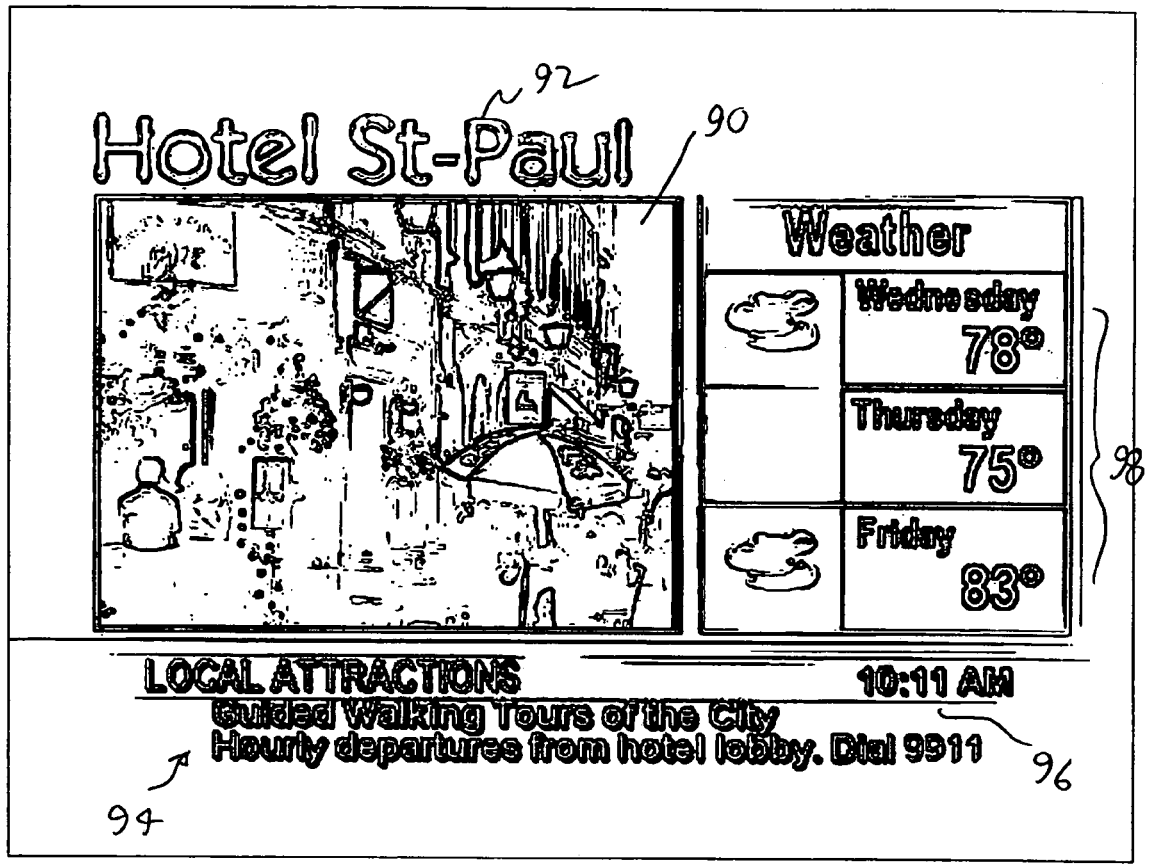
FIG. 5 shows an example of an output composite graphical video stream produced by the arrangement and method of the present invention.

FIG. 5 shows an example of an output composite graphical video stream produced by the arrangement and method of the present invention. In FIG. 5 an output video screen has a live video feed portion 90, which is a camera mounted on the exterior of a hotel showing guests the weather and outdoor conditions outside of the hotel. The live video feed portion 90 is surrounded by a number of graphical objects including text providing the hotel name 92 as well as event information 94 which is relatively static graphic information. Other text information is presented to a viewer based on a data feed, including a presentation of the time of day 96 and weather forecast information 98. Each of these graphical elements of the output video stream are produced from the present invention.

Figure 6:
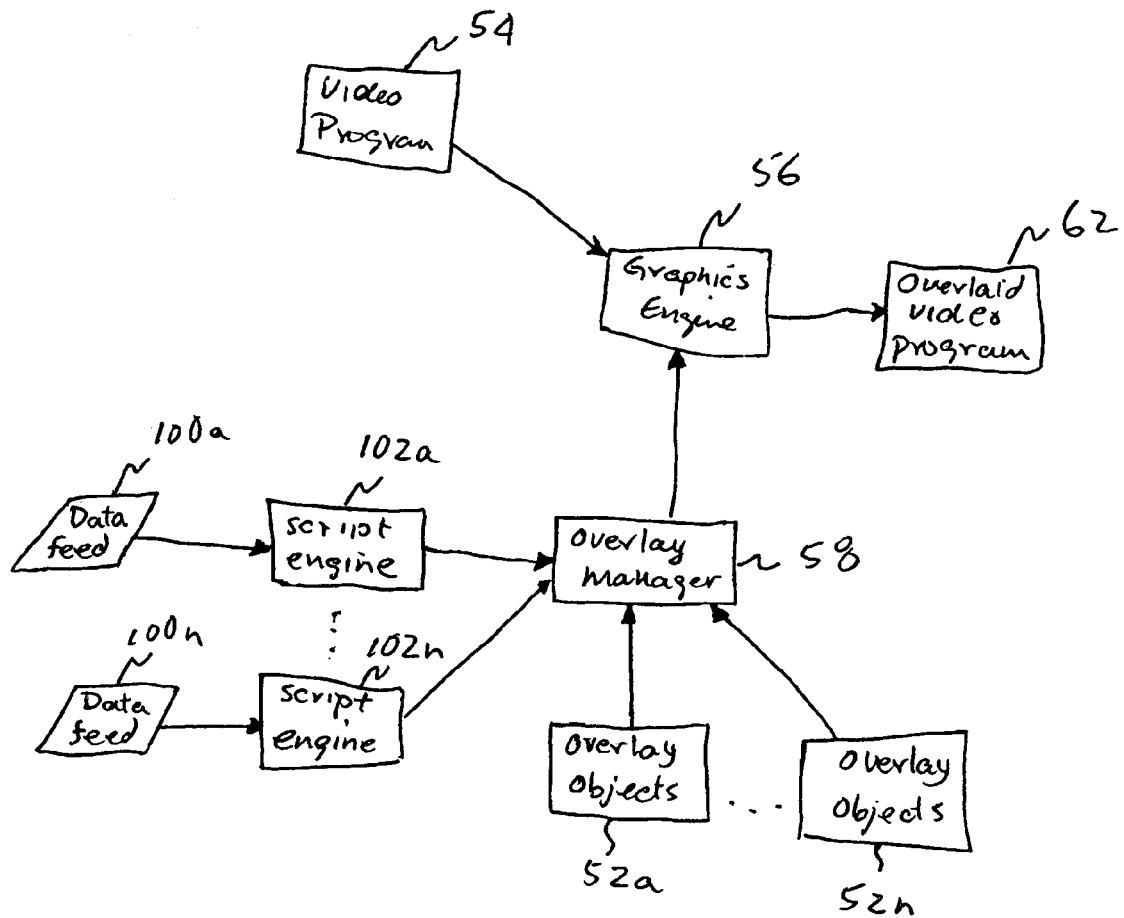
FIG. 6 shows a functional process flow diagram depicting the process flows to the overlay manager to provide an overlaid video program.

FIG. 6 shows a functional process flow diagram depicting the process flows to the overlay manager 58 to produce an overlaid video program 62 from data feeds 100a through 100n. Each data feed has a corresponding script engine 102a through 102n. The script engine provides instructions to the computer 40, on which the script engine 102 is running, to process a corresponding data feed 100. The processing of the corresponding data feed results in instructions provided to overlay manager 58 to incorporate the data content of the data feed onto the overlay video program 62 with reference to the corresponding overlay object 52a through 52n to which the data feed corresponds. For example, in the overlaid video program of FIG. 5, a data feed showing the time of day 96 is provided. A script that is input to a script engine 102 controls the overlay objects of the time of day 96 display. The time of day script updates the content of the graphics that represent the time of day, in the FIG. 10:11 a.m. is shown, based on a data feed that represents the time of day. The scrip is used to process the time of day data, while, user input to the corresponding PowerPoint (trademark) objects controls the format and location of the time of day a presentation. Similarly, other data feeds, such as weather forecasts which contain data including the day of the forecast and the temperature of the forecast, together with a corresponding graphic image such as a cloud or rain or sunshine as shown in the weather forecast graphic portion of the display. In FIG. 5, a weather forecast is illustrated at reference numeral 98 and is produced based on a weather data feed which has a corresponding script engine to reference the overlay objects that will produce the graphical representation of the weather data on the screen.

Each of these graphics and their corresponding data objects can be updated by a script that processes a data feed which is associated with a corresponding PowerPoint (trademark) graphic object that the PowerPoint (trademark) data object parser 50 has manipulated to produce an overlay object 52. In accordance with the process shown in FIG. 2, the PowerPoint (trademark) objects 48 are processed by the PowerPoint (trademark) data object parser to produce the overlay objects 52. Those overlay objects are updated by the script engine 102 of FIG. 6 based on the information that script engine receives from its corresponding data feed.

Now that the invention has been described with reference to the preferred embodiment and drawings accompanying this description, the scope of the invention is defined by the claims appended hereto.

I claim:

1. A method for combining a source video signal and one or more graphical elements using a preexisting computer-based graphics program to generate a composite video signal, said method comprising:
   providing a work area in said preexisting computer-based graphics program to enable a user to add data objects thereto, said data objects being available from said preexisting computer-based graphics program and associated with said one or more graphical elements;
   providing in said work area, a region for said source video signal;
   enabling said user to interact with said work area to control the location, size, and appearance of said one or more graphical elements in relation to said region for said source video signal;
   generating a graphical overlay using said graphical elements according to the current state of said work area;
   combining said graphical overlay and said source video signal to generate said composite video signal; and
   providing said composite video signal as an output to be used by a graphics engine;
wherein said preexisting computer-based graphics program is a commercially available software program that is independently operable to provide stand-alone functionality for at least one use other than said method.

2. A method according to claim 1 wherein said preexisting computer-based graphics program is Microsoft PowerPoint (trademark).

3. A method according to claim 1 further comprising providing bounding lines in said work area to control the size of said region for said source video signal.

4. A method according to claim 1 further comprising providing a mask for at least one of said data objects for controlling the opacity of the appearance of said one or more graphical elements.

5. A method according to claim 1 further comprising providing a user interface dialog box in said computer-based graphics program for controlling said step of combining said graphical overlay and said source video signal.

6. A method according to claim 5 wherein said user interface is a floating dialog box.

7. A method according to claim 1 further comprising providing said output to a video screen.

8. A method according to claim 7 further comprising obtaining said source video signal from a camera as a live video feed and incorporating said live video feed into said output.

9. A method according to claim 1 further comprising providing a script engine to control said output according to a script.

10. A method according to claim 9 wherein said script instructs said script engine to control said output according to time.

11. A computer readable medium having computer executable instructions for performing the method according to claim 1.

12. A computer readable medium according to claim 11 comprising a software program stored on a computer.

13. A method for adapting a preexisting computer-based graphics program for generating a composite video feed comprising:
prov333ing a software tool in said preexisting computer-based graphics program that enables a user to load an overlay interface for adding data objects available directly from said computer-based graphics program;
providing in said overlay interface, a region for a source video signal; and
enabling said user to generate a composite video signal using said software tool, said composite video signal comprising said source video signal and one or more graphical elements associated with said data objects;
wherein said preexisting computer-based graphics program is a commercially available software program that is independently operable to provide stand-alone functionality for at least one use other than said method.

14. A method according to claim 13 further comprising said software tool providing an output to be used by a graphics engine.

15. A method according to claim 14 further comprising said software tool providing said output to a video screen.

16. A method according to claim 13 wherein said preexisting computer-based graphics program is Microsoft PowerPoint (trademark).

17. A method according to claim 13 wherein said software tool is embodied by a floating dialog box.

18. A computer readable medium having computer executable instructions for performing the method according to claim 13.

19. A computer readable medium according to claim 18 comprising a software program stored on a computer.

* * * * *